United States Patent Office 3,496,185
Patented Feb. 17, 1970

3,496,185
OXAZOLO- AND THIAZOLO[3,4-a]-PYRIDINE DERIVATIVES
Bernard Loev, Philadelphia, Pa., assignor to Smith Kline & French Laboratories, Philadelphia, Pa., a corporation of Pennsylvania
No Drawing. Continuation-in-part of application Ser. No. 586,669, Oct. 14, 1966. This application Feb. 14, 1968, Ser. No. 705,282
Int. Cl. C07d 91/32, 85/46
U.S. Cl. 260—293.4
4 Claims

ABSTRACT OF THE DISCLOSURE

Hexahydro - 1,1 - diphenyloxazolo[3,4 - a]pyridin - 3-imines, hexahydro-1,1-diphenylthiazolo[3,4 - a]pyridine-3-thiones and hexahydro-1,1-diphenylthiazolo[3,4-a]pyridin-3-ones and 3-imines, prepared from α,α-diphenyl-2-piperidinemethanol, have central nervous system stimulant activity.

This application is a continuation-in-part of Ser. No. 586,669 filed Oct. 14, 1966, and now abandoned.

This invention relates to new oxazolo- and thiazolo-[3, 4-a]pyridine derivatives having pharmacodynamic activity. In particular, the compounds of this invention have central nervous system stimulant activity. These compounds are active in rats at doses of about 15 to 50 mg./kg. orally in the test for prevention of reserpine induced ptosis which is a test for a kind of activity produced by antidepressants.

The novel compounds of this invention are represented by the following general formula:

Formula I

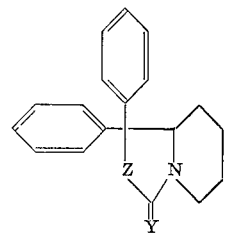

in which:

Z is oxygen or sulfur;
Y is NR or, when Z is sulfur, oxygen or sulfur; and
R is hydrogen, lower alkyl or lower alkanoyl and, when Y is NH, nontoxic, pharmaceutically acceptable, acid addition salts thereof.

The pharmacodynamically active compounds of this invention have the basic structure of Formula I. However, it is apparent to one skilled in the art that obvious nuclear substituents may be incorporated on the phenyl rings. Such substituents, which are known to the art, are halogen, trifluoromethyl, lower alkyl, lower alkoxy or dimethylamino.

The terms "lower alkyl," "lower alkoxy" and "lower alkanoyl" where used herein denote groups having 1 to 4 carbon atoms.

The compounds of this invention are prepared by the following procedure:

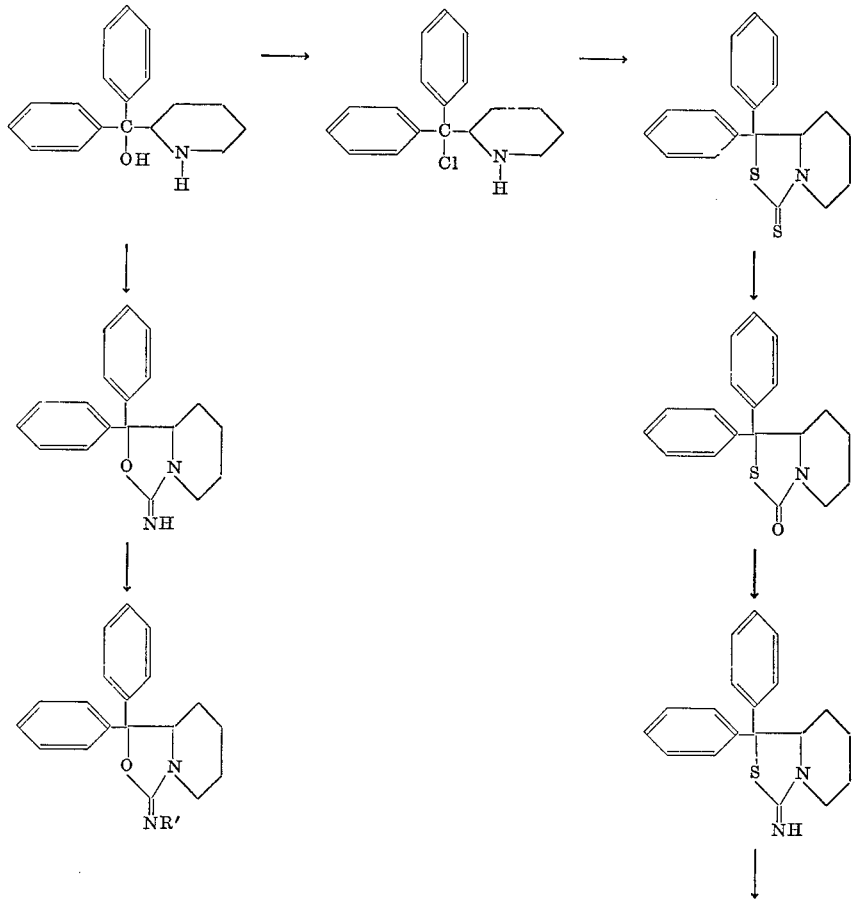

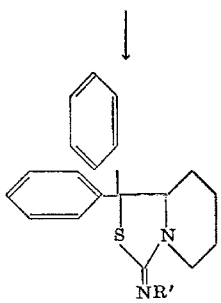

The term R' is lower alkyl or lower alkanoyl.

According to the above procedure, the hexahydrooxazolo[3,4-a]pyridin-3-imines of this invention are prepared by treating a 2-piperidylmethanol with cyanogen bromide in a hydrocarbon solvent such as toluene or benzene. The hexahydro-oxazolo[3,4-a]pyridin-3-imine is treated with an alkylating agent such as a lower alkyl halide in a solvent such as a lower alkanol or acetone or with an acylating agent such as lower alkanoyl halide or a lower alkanoic acid anhydride to give the N-lower alkyl and N-lower alkanoyl hexahydro - oxazolo[3,4 - a]pyridin - 3-imines of this invention respectively.

By the above procedure, to prepare the hexahydrothiazolo[3,4-a]pyridine-3-thione of this invention a 2-piperidylmethanol is reacted with a chlorinating agent such as thionyl chloride to give the chloride which is treated with carbon disulfide in an alkaline solution, such as aqueous sodium or potassium hydroxide solution. The hexahydrothiazole[3,4-a]pyridin-3-one of this invention is prepared by treating a hexahydrothiazolo[3,4-a]pyridine-3-thione with hydrogen peroxide. The corresponding pyridin - 3 - imine and N-lower alkyl and N-lower alkanoyl derivatives thereof are prepared by treating the pyridine-3-one with an alkylating agent such as a lower alkylsulfate or a tri-lower alkyloxonium fluoborate to give a salt and reacting the salt with ammonia, N-lower alkylamine or N-lower alkanoylamine to prepare the imine, N-lower alkyl amines or N-lower alkanoyl imines, respectively.

In the above procedure, substituents such as halogen, trifluoromethyl, lower alkyl, lower alkoxy or dimethylamino may be present on the phenyl rings of the starting material to give the correspondingly substituted compounds having the basic structure of Formula I.

The nontoxic pharmaceutically acceptable, acid addition salts of the compounds of Formula I in which Y is NH are formed with organic and inorganic acids by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The compounds of Formula I may be administered in conventional dosage forms by incorporating an appropriate does of the compound with pharmaceutical carriers according to accepted pharmaceutical practices.

The following examples are not limiting but are illustrative of the compounds of this invention and procedures for their preparation.

EXAMPLE 1

Thionyl chloride (50 ml.) is added slowly with stirring to a solution of 14.0 g. of α,α-diphenyl-2-piperidinemethanol in 200 ml. of chloroform. The resulting solution is warmed and stirred for about 15 minutes, then filtered. The filtrate is concentrated to dryness and isopropyl ether is added to the residue. Filtering gives α,α-diphenyl-2-piperidinemethyl chloride.

Carbon disulfide (2.1 g.) is added to 6.3 g. of the above prepared chloride dissolved in 100 ml. of water. The mixture is stirred vigorously and 7.5 ml. of 10% aqueous sodium hydroxide solution is added dropwise with cooling. The mixture is stirred at room temperature for three hours then allowed to stand. Methylene chloride is added and the organic layer is washed with water, dried over magnesium sulfate and concentrated. The residue is treated with ethanol and filtered. Concentrating the filtrate, adding ethanol, filtering and recrystalizing the solid material from methylene chloride-ether gives hexahydro-1,1 - diphenyl-3H - thiazolo[3,4-a]pyridine-3-thione.

EXAMPLE 2

A solution of 5.3 g. of cyanogen bromide in 50 ml. toluene is added dropwise to 13.2 g. of α,α-diphenyl-2-piperidinemethanol in 100 ml. of toluene at 40° C. The mixture is refluxed for 15 hours, then cooled and filtered. The solid is dissolved in 20 ml. of hot isopropanol containing 5 mg. of ethanol. Adding hexane and filtering gives hexahydro-1,1-diphenyl - 3H - oxazolo[3,4 - a]pyridin-3-imine hydrobromide, M.P. 194° C.

The above prepared hydrobromide salt is dissolved in hot water and excess sodium hydroxide is added. Filtering gives hexahydro-1,1-diphenyl-3H - oxazolo[3,4-a]pyridin-3-imine.

EXAMPLE 3

Four grams of hexahydro-1,1-diphenyl-3H-oxazolo-[3,4-a]pyridin-3-imine hydrobromide (prepared as in Example 2) is dissolved in hot water and the resulting solution is made basic, then extracted with methylene chloride. The methylene chloride is removed from the extracts in vacuo and the residue which is hexahydro-1,1-diphenyl - 3H-oxazolo-[3,4-a]pyridin-3-imine is refluxed for two hours with 100 ml. of acetic anhydride. The solution is then concentrated to dryness to give, as the residue, N-acetyl-hexahydro - 1,1-diphenyl - 3H-oxazolo-[3,4-a]pyridin-3-imine.

Treating the above prepared base with an excess of picric acid in ethanol gives, after concentrating and recrystallizing from ethanol, N-acetyl - hexahydro-1,1-diphenyl-3H-oxazolo[3,4-a]pyridin - 3 - imine picrate, M.P. 173–175.5° C.

By the above procedure using 100 ml. of butyric anhydride in place of acetic anhydride, the product is N-butyryl - hexahydro - 1,1-diphenyl-3H - oxazolo[3,4-a]pyridin-3-imine and the picrate salt thereof.

EXAMPLE 4

A solution of 3 g. of hexahydro-1,1-diphenyl-3H-thiazolo[3,4-a]pyridine-3-thione (prepared as in Example 1) in 10 ml. methanol and 1 g. of 30% aqueous hydrogen peroxide is stirred at room temperature for 18 hours.

The excess peroxide is decomposed by stirring with manganese dioxide, then the solution is diluted with water. Filtering off the precipitate and recrystallizing it from aqueous ethanol gives hexahydro-1,1-diphenyl-3H-thiazolo[3,4-a]pyridin-3-one.

EXAMPLE 5

A mixture of 30.9 g. of hexahydro-1,1-diphenyl-3H-thiazolo[3,4-a]pyridin-3-one (prepared as in Example 4) and 12.6 g. of methylsulfate is heated at 70° C. for two hours, then cooled, stirred with ether and filtered. The salt thus obtained is dissolved in ethanol and ammonia is passed into the ethanol solution for 20 minutes. The mixture is stirred for one hour, then concentrated to dryness in vacuo. Water is added to the residue. Dilute sodium hydroxide solution is added and the resulting solid material is filtered off to give hexahydro-1,1-diphenyl-3H-thiazolo[3,4-a]pyridin-3-imine.

By the above procedure using in place of ammonia, the following amines in ethanol: methylamine; ethylamine; butylamine; the following products are obtained, respectively— hexahydro - N-methyl - 1,1-diphenyl-3H-thiazolo[3,4-a]-pyridin-3-imine
N-ethyl - hexahydro - 1,1-diphenyl-3H-thiazolo[3,4-a]-pyridin-3-imine
N-butyl-hexahydro-1,1-diphenyl-3H-thiazolo[3,4-a]-pyridin-3-imine.

EXAMPLE 6

The salt prepared from 30.9 g. of hexahydro-1,1-diphenyl - 3H - thiazolo[3,4-a]pyridin - 3 - one (prepared as in Example 4) and 12.6 g. of methylsulfate by the procedure of Example 5 is treated with 6.8 g. of sodium ethoxide in ethanol. The mixture is stirred for one hour, then concentrated in vacuo. Methylene chloride (100 ml.) is added. To this mixture is added 11.8 g. of acetamide. The resulting mixture is stirred for four hours, then filtered. The filtrate is concentrated in vacuo and the residue is stirred with isopropyl ether to give, after filtering, N-acetyl - hexahydro - 1,1 - diphenyl - 3H - thiazolo[3,4-a]-pyridin-3-imine.

Similarly, by the above procedure using 14.6 g. of propionamide in place of acetamide, the product is hexahydro - 1,1 - diphenyl - N - propionyl - 3H - thiazolo[3,4-a]-pyridin-3-imine.

EXAMPLE 7

By the procedure of Example 1 using the following in place of α,α-diphenyl-2-piperidinemethanol:

α-phenyl-α-(p-tolyl)-2-piperidinemethanol
α-(p-ethylphenyl)-α-phenyl-2-piperidinemethanol
α-(p-methoxyphenyl)-α-phenyl-2-piperidinemethanol
α,α-bis(p-chlorophenyl)-2-piperidinemethanol
α-(p-dimethylaminophenyl)-α-phenyl-2-piperidinemethanol the following products are obtained, respectively— hexahydro-1-phenyl-1-(p-tolyl)-3H-thiazolo[3,4-a]-pyridine-3-thione
1-(p-ethylphenyl)-hexahydro-1-phenyl-3H-thiazolo[3,4-a]pyridine-3-thione
hexahydro-1-(p-methoxyphenyl)-1-phenyl-3H-thiazolo[3,4-a]pyridine-3-thione
1,1-bis(p-chlorophenyl)-hexahydro-3H-thiazolo[3,4-a]-pyridine-3-thione
1-(p-dimethylaminophenyl)-hexahydro-1-phenyl-3H-thiazolo[3,4-a]pyridine-3-thione.

Reacting each of the above prepared thiones with hydrogen peroxide by the procedure of Example 4 gives the following products, respectively:

hexahydro-1-phenyl-1-(p-tolyl)-3H-thiazolo[3,4-a]-pyridin-3-one
1-(p-ethylphenyl)-hexahydro-1-phenyl-3H-thiazolo[3,4-a]pyridin-3-one
hexahydro-1-(p-methoxyphenyl)-1-phenyl-3H-thiazolo[3,4-a]pyridin-3-one
1,1-bis(p-chlorophenyl)-hexahydro-3H-thiazolo[3,4-a]-pyridin-3-one
1-(p-dimethylaminophenyl)-hexahydro-1-phenyl-3H-thiazolo[3,4-a]pyridin-3-one.

By the procedure of Example 5 the above prepared thiazolo[3,4-a]pyridin-3-ones are reacted with methylsulfate and the resulting salt is treated with ammonia in ethanol to give, after concentrating, then adding water and dilute sodium hydroxide solution and filtering, the following products, respectively:

hexahydro-1-phenyl-1-(p-tolyl)-3H-thiazolo[3,4-a]-pyridin-3-imine
1-(p-ethylphenyl)-hexahydro-1-phenyl-3H-thiazolo-[3,4-a]pyridin-3-imine
hexahydro-1-(p-methoxyphenyl)-1-phenyl-3H-thiazolo[3,4-a]pyridin-3-imine
1,1-bis(p-chlorophenyl)-hexahydro-3H-thiazolo[3,4-a]-pyridin-3-imine
1-(p-dimethylaminophenyl)-hexahydro-1-phenyl-3H-thiazolo[3,4-a]pyridin-3-imine.

EXAMPLE 8

By the procedure of Example 2 using in place of α,α-diphenyl-2-piperidinemethanol the following:

α-phenyl-α-(o-tolyl)-2-piperidinemethanol
α,α-bis(p-ethoxyphenyl)-2-piperidinemethanol
α-(p-bromophenyl)-α-phenyl-2-piperidinemethanol
α-(m-chlorophenyl)-α-phenyl-2-piperidinemethanol
α-(p-fluorophenyl)-α-phenyl-2-piperidinemethanol
α,α-bis-(p-dimethylaminophenyl)-2-piperidinemethanol the following products are obtained, respectively— hexahydro-1-phenyl-1-(o-tolyl)-3H-oxazolo[3,4-a]-pyridin-3-imine
1,1-bis(p-ethoxyphenyl)-hexahydro-3H-oxazolo[3,4-a]-pyridin-3-imine
1-(p-bromophenyl)-hexahydro-1-phenyl-3H-oxazolo[3,4-a]pyridin-3-imine
1-(m-chlorophenyl)-hexahydro-1-phenyl-3H-oxazolo[3,4-a]pyridin-3-imine
1-(p-fluorophenyl)-hexahydro-1-phenyl-3H-oxazolo[3,4-a]pyridin-3-imine
1,1-bis(p-dimethylaminophenyl)-hexahydro-3H-oxazolo[3,4-a]pyridin-3-imine.

EXAMPLE 9

To the Grignard reagent prepared from 22.5 g. of p-bromo-α,α,α-trifluorotoluene and 2.4 g. of magnesium in 200 ml. of anhydrous ether which is cooled to −40° C. is added 10.3 g. of benzonitrile with stirring. The mixture is allowed to stand for 24 hours; the ether is removed in vacuo. The residue is refluxed with 100 ml. of 10% hydrochloric acid for one hour. The mixture is extracted with ether and the ether is removed in vacuo to give p-trifluoromethylbenzophenone.

Lithium (1.4 g.) and 13.7 g. of n-butyl bromide are mixed in 150 ml. of dry ether at −10° C. under nitrogen. The mixture is stirred for two hours, then cooled to −60° C. 2-bromopyridine (14 g.) in 50 ml. of dry ether is added to the mixture slowly at about −40° C., then the mixture is cooled to −60° C. and treated with 20.8 g. of p-trifluoromethylbenzophenone in 50 ml. of anhydrous ether. The resulting mixture is stirred at about −40° C. for three hours. The temperature is then raised to 20° C. and aqueous ammonium chloride is added. Filtering and concentrating the filtrate in vacuo and recrystallizing the residue from methanol gives α-phenyl-α-trifluoromethylphenyl-2-pyridinemethanol.

A mixture of α-phenyl-α-trifluoromethylphenyl-2-pyridinemethanol hydrochloride (prepared by mixing 33 g. of the above prepared pyridinemethanol base in methanol with an equivalent of methanolic hydrogen chloride, diluting with ether, cooling and filtering), 100 ml. methanol and 0.35 g. of platinum oxide is hydrogenated at about 3 atmospheres pressure until 0.3 mole of hydrogen is absorbed. The mixture is filtered and the filtrate is concentrated, treated with ether, cooled and filtered to give α-phenyl - α - trifluoromethylphenyl-2-piperidinemethanol hydrochloride.

By the procedure of Example 1 using α-phenyl-α-trifluoromethylphenyl - 2 - piperidinemethanol (prepared by dissolving the above prepared piperidinemethanol hydrochloride in methanol and neutralizing with dilute aqueous sodium hydroxide solution, then extracting with benzene and removing the benzene from the extracts in vacuo in place of α,α-diphenyl-2-piperidinemethanol, the product is hexahydro - 1 - phenyl - 1 - trifluoromethylphenyl-3H-thiazolo[3,4-a]pyridine-3-thione.

Treating the above prepared base in ethanol with hydrogen chloride, then adding ether and filtering gives hexahydro-1-phenyl - 1 - trifluoromethylphenyl - 3H - thiazolo[3,4-a]pyridine-3-thione hydrochloride.

EXAMPLE 10 p-Bromo-α,α,α-trifluorotoluene (11.2 g.) in 50 ml. of dry ether is added to 0.69 g. of lithium in 100 ml. of dry ether slowly with stirring and refluxing. After cooling the mixture to about −35 to −40° C., 3 g. of ethyl picolinate in 25 ml. of ether is added over a period of 30 minutes and the mixture is then allowed to warm to room temperature. Refluxing for one hour, then adding aqueous ammonium chloride solution and filtering gives α,α-bis-(p-trifluoromethylphenyl)-2-pyridinemethanol.

Converting the above prepared pyridinemethanol to the hydrochloride salt and hydrogenating by the procedure of Example 9 gives α,α-bis(p-trifluoromethylphenyl)-2-piperidinemethanol.

Using the above prepared piperidinemethanol in place of α,α-diphenyl-2-piperidinemethanol in the procedure of Example 2 gives hexahydro-1,1-bis(p-trifluoromethylphenyl)-3H-oxazolo[3,4-a]pyridin-3-amine.

What is claimed is:
1. A member selected from the group consisting of compounds of the formula:

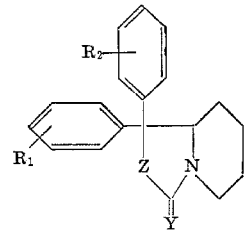

in which: $R_1$ and $R_2$ are hydrogen, halogen, trifluoromethyl, lower alkyl, lower alkoxy or dimethylamino; Z is oxygen or sulfur; Y is NR or, when Z is sulfur, oxygen or sulfur; and R is hydrogen, lower alkyl or lower alkanoyl and, when Y is NH, nontoxic, pharmaceutically acceptable, acid addition salts thereof.

2. A compound according to claim 1 in which Z and Y are sulfur.

3. A compound according to claim 1 in which Z is oxygen, Y is NR and R is hydrogen.

4. A compound according to claim 1 in which Z is oxygen, Y is NR and R is acetyl.

References Cited

FOREIGN PATENTS 995,964   6/1965   Great Britain.

HENRY R. JILES, Primary Examiner

S. D. WINTERS, Assistant Examiner

U.S. Cl. X.R.

260—293, 294, 294.7, 999